United States Patent [19]

Biranowski et al.

[11] 4,094,869

[45] June 13, 1978

[54] THERMALLY STABLE, RIGID, CELLULAR ISOCYANURATE POLYURETHANE FOAMS

[75] Inventors: Jerome B. Biranowski, Bronx, N.Y.; Donald H. Lorenz, Basking Ridge, N.J.

[73] Assignee: GAF Corporation, New York, N.Y.

[21] Appl. No.: 587,063

[22] Filed: Jun. 16, 1975

[51] Int. Cl.$^2$ ............................................. C08G 18/14
[52] U.S. Cl. .......................... 260/2.5 AW; 260/2.5 AJ
[58] Field of Search ................... 260/2.5 AJ, 2.5 AW

[56] References Cited

U.S. PATENT DOCUMENTS

| 3,676,380 | 7/1972 | McLaughlin et al. ........ 260/2.5 AW |
| 3,738,953 | 6/1973 | Angora et al. .................. 260/2.5 AJ |
| 3,799,896 | 3/1974 | Moss ............................... 260/2.5 AW |
| 3,909,464 | 9/1975 | Angora et al. .................. 260/2.5 AJ |
| 3,919,166 | 11/1975 | Brachman ........................ 260/2.5 AJ |

*Primary Examiner*—Eugene C. Rzucidlo
*Attorney, Agent, or Firm*—Walter C. Kehm; Joshua J. Ward

[57] ABSTRACT

Rigid isocyanurate urethane polymers useful for insulation purposes and characterized by unexpected and significantly superior thermal stability are achieved by incorporation therein of 2,3-dibromo-2-butene-1,4-diol, antimony oxide and hydrated alumina.

25 Claims, No Drawings

THERMALLY STABLE, RIGID, CELLULAR ISOCYANURATE POLYURETHANE FOAMS

BACKGROUND OF THE INVENTION

The demand for fire retardant rigid polyurethane foams has increased sharply in recent years as have the governmental and industry requirements and standards that these foams must meet before they may be used in the many areas where their application is particularly desired; notably, the construction industry.

Methods for imparting fire retardancy to polyether and polyester urethane foams heretofore have included the physical incorporation of unreactive fillers and additives; the addition of flame-retardant compounds containing functional groups which become chemically bound in the polymeric urethane chain; and the coating of the inflammable foam with flame-retarding materials.

Among the unreactive additives have been inorganic and organic substances. Illustrative of the inorganic additives have been metal oxides such as $Sb_2O_3$, ZnO and $Al_2O_3$. It has also been suggested heretofore to incorporate a combination of these unreactive additives to secure good fire retardancy.

The use of hydrated alumina and antimony oxide as additives in low density, flexible and semi-flexible polyurethanes incorporating halogen-containing polymers, such as polyvinyl chloride, has also been suggested, illustratively in U.S. Pat. No. 3,810,851. There is also described in U.S. Pat. No. 3,737,400 a polyurethane foam said to possess self-extinguishing characteristics wherein the flame-suppressing agent is ammonium sulfate together with aluminum hydroxide hydrate and KCl, $K_2O$, $KNO_3$, $Ca(OH)_2$, $Mg(OH)_2$, $K_2SO_4$ and $Ba(OH)_2$.

Further illustrative of the additives for use in rendering polyurethane foams flame retardant and reported heretofore in U.S. Pat. No. 3,262,894 is tris-(2-chloroethyl) phosphate in combination with alumina trihydrate.

The improvement in fire retardancy provided by the foregoing additives has often been obtained however at some sacrifice in physical properties. Thus, load-bearing capacity and closed cell content have been found to decrease frequently while moisture vapor pressure transmission often increases. The strength properties of humid aging at elevated temperatures are usually reduced considerably, as well.

To retain the inherent physical properties of the foam considered desirable for use in construction, appliances and the like while imparting an adequate fire retardancy thereto has thus involved a compromise between desired objectives.

One means for alleviating this compromise has been by incorporation of a flame-retarding moiety in the polymer chain itself. Thus, polyurethane foams prepared from the reaction of a polymeric isocyanate; an organic compound incorporating active hydrogen-containing groups reactive with isocyanate moieties; and a dibromobutenediol have, for example, been suggested heretofore. These polyurethanes have been characterized by a significant fire retardancy and have been described broadly for use in fibers, foams, and particularly flexible foams. films and the like. It has also been known to prepare rigid foams manifesting a thermal and oxidative stability considered adequate in various applications utilizing thermal insulation by inclusion in the cross-linked urethane polymer of conventional isocyanurates resulting from isocyanate trimerization in the production of the rigid foam.

While it has thus been known heretofore to prepare various cellular polyurethane foams imbued with a certain desirable thermal stability including rigid foams appropriate for use as rigid thermal insulation in construction materials and appliances, the best of these foams do not have a thermal stability adequate to meet all of the rigorous standards laid down by government and industry for use of these foams in particular applications; at least without the inclusion of additional thermal barriers requiring a special laminate construction made, for example, of perlite and vermiculite.

Accordingly, if the flammability, in terms of flame retardancy and anti-scorching properties of rigid polyurethane foams for use in construction materials and the like could be substantially improved without adversely affecting the properties of these rigid foams which render them otherwise particularly useful, and permits this objective to be accomplished without a material increase in the cost of production thereof, a significant advance in the state of the art would be achieved.

SUMMARY OF THE INVENTION

It is therefore a principal object of this invention to provide novel rigid polyurethane foam compositions of significantly improved thermal stability.

It is a further object of this invention to provide a rigid isocyanurate-urethane polymeric foam possessed of a thermal stability sufficient inherently to meet the most rigorous government and industry standards for thermal insulation material and characterized normally by significantly enhanced and unexpected oxygen indices.

It is a further object of this invention to impart significantly improved thermal stability to rigid isocyanurate polyether urethane and polyester urethane foams without adversely affecting the other physical properties normally characterizing these foams and rendering them useful in thermal insulation applications for, illustratively, the construction and appliance industries.

It is a particular object of this invention to provide a thermal insulating rigid isocyanurate polyurethane foam capable of meeting the industry standard in the United States of America for roof insulation and most particularly that normally employed in factory and similar functional structures.

It is a still further object of this invention to produce rigid foams having the properties described herein by a simple "one-shot" process.

Other and additional advantages will become more apparent from the following description.

Accordingly, it has now been discovered that rigid isocyanurate-urethane polymeric foams of significantly enhanced fire-retardant properties can be produced meeting the most demanding industry as well as governmental regulatory standards directed to the fire retardancy of polyurethane foams for use as thermal insulating materials in the construction industry without otherwise adversely affecting the desirable properties of the foam product by incorporation therein of 2,3-dibromo-2-butene-1,4-diol, antimony oxide and hydrated alumina.

DESCRIPTION OF THE PREFERRED EMBODIMENT

The rigid, stable, cellular polyurethane foams prepared according to the invention are characterized by unexpectedly high oxygen indices permitting use of reduced quantities of the fire-retardant components contemplated by the invention. The test procedure employed for determining the oxygen index of the foams described herein is ASTM D-2863.

Flowing from this unexpectedly superior thermal stability is the capacity of the cellular foams described herein to meet the industry-wide standards for employment of insulation materials possessed of a substantial resistance to damage by exposure to radiant heat and a materially reduced fuel contribution rate. These properties are particularly critical in roofing insulation materials for use over steel roof decks and like steel structures.

The foregoing fuel contribution rate standards have been defined on the basis that flame spreading over a noncombustible surface, such as a metal faced combustible core assembly is dependent upon the fuel contribution rate of the combustible components and not on the surface burning characteristics of the assembly. As noted in the industry descriptions of these standards, it has been well established in rapidly spreading building fires on the underside of insulated steel roof decks that it is the combustible materials disposed above the deck that have supplied the necessary fuel contribution to induce flame spread.

The resistance to damage upon exposure to radiant energy met uniquely and substantially by the isocyanurate-urethane foams of the invention is delineated in Appendix C ("Susceptibility to Heat Damage Test Standard for Class I Roof Insulations") of the bulletin, "Approval Standard for Class I Insulated Steel Deck Roofs", published by the Factory Mutual Research Corporation.

The terms "polyurethane," "polyether urethane" and "polyester urethane" and technical equivalents thereof, as employed herein, are intended to embrace the products generally produced by the reaction of a polyisocyanate and a polyol. Accordingly, these terms are intended to include those of the foregoing reaction products incorporating repeating urea, as well as urethane, units.

The present invention thus comprises rigid isocyanurate polyether urethane and polyester urethane foams incorporating hydrated alumina, antimony oxide and 2,3-dibromo-2-butenediol-1, 4 together. These cellular foams are prepared in an otherwise standard one-shot operation.

More particularly, the isocyanurate polyether urethane and isocyanurate polyester urethane foams coming within the scope of the present invention are those produced by admixture of an unhalogenated polyol; a polymeric isocyanate; and more particularly, a highly reactive polyphenyl polyalkylene polyisocyanate; 2,3-dibromo-2-butenediol-1,4; a hydrated alumina; antimony oxide ($Sb_2O_3$); a blowing agent; a surfactant, and preferably a silicone surfactant; and desirably, but not essential to the products secured herein, a basic nitrogen-containing polyol; in the presence of a trimerization catalyst; that is, a catalyst which tends to accelerate the conventional reaction between the isocyanate moiety of the organic polyisocyanate constituent and the active hydrogen-containing group of the polyol components while causing the effective trimerization of the aforesaid polyisocyanate components.

The bromohydrin component, 2,3-dibromo-2-butenediol-1,4, is incorporated in the polymer chain of the isocyanurate-urethane composition described herein, while the hydrated alumina and antimony oxide are essentially unreactive. Yet the combination of these components in the foams contemplated by this invention imparts an elevated oxygen index to the foregoing foams, in the critical proportions recited, unanticipated from utilization of the same components in identical quantities and in any combination in which only two of the three components are present.

The rigid cellular foams for use herein include, as indicated, isocyanurate polyester urethanes as well as the isocyanurate polyether urethanes although the latter are preferred because they are less expensive to produce and possess a greater inherent hydrolytic stability.

The polyisocyanate component, the hard segment source of NCO groups for reaction with the active hydrogen components of the polyols described in further detail hereinafter, are the polymethylene polyphenyl polyisocyanates well-known to those skilled in the art to which this invention relates and obtained by phosgenation of mixtures of the corresponding methylene-bridged polyphenyl polyamines. The latter are secured by the hydrochloric-acid catalyzed condensation of primary aromatic amines such, illustratively, as aniline, using procedures well-known in the art.

These polymethylene polyphenyl polisocyanates are characterized by the general formula:

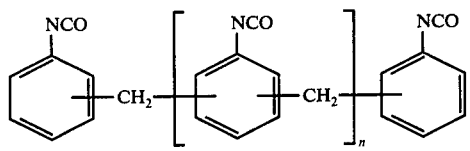

wherein $n$ is predominantly an integer of 1 or 0 or a mixture wherein $n$ is primarily 1 in a preferred embodiment and to a lesser extent 0, and thus the trimer, dimer or mixtures thereof, and where as preferred, this isocyanate is used in an undistilled state, will include residual or trace amounts of high polymers as well. The average isocyanate functionality of these polymers is consequently in the range of about 2.25 to about 3.2 or higher depending upon the specific aniline-to-formaldehyde molar ratio used in the initial condensation. While aromatic amines other than aniline may be employed for the purpose of producing the cellular polyisocyanurate trimer foams described herein, the aromatic isocyanate moiety should, most desirably, not contain substituents in the ortho position. The polyphenyl polymethylene polyisocyanates thus employed are available commercially, for example, under the trade names Mondur MR, PAPI and AFPI. They are liquids having a reduced viscosity of about 50–500 centipoises at 25° centigrade (C.).

Suitable unhalogenated or substantially neutral polyols providing the soft segment portion, that is the source of the active hydrogen moieties, used in the preparation of the isocyanurate polyether urethane cellular foams include most desirably the poly (oxypropylene) polyols such as those sold by Dow Chemical Company under the trade name Voranol. Illustrative of these most preferred polyols are the poly (oxypropylene) derivatives of sucrose as described illustratively in U.S. Pat. No. 2,552,528 and U.S. Pat. No. 2,674,619. Other efficacious polyether polyols that are also employed include the alkylene oxide adducts, for example, of such polyhydroxy-containing organic compounds as ethylene glycol, diethylene glycol, propylene glycol, trimethylene glycol, dipropylene glycol, butylene glycols; glycerol 1, 2, 6-hexanetriol; 1,1,1-trimethylolethane; 1,1,1-trimethylolpropane; 3-(2-hydroxyethoxy)-1,2-propanediol; pentaerythritol; 1,2-cyclohexanediol; sorbitol; lactose; glycosides such as alpha-methylglucoside and alpha hydroxyalkyl glucoside, fructoside and the like; compounds in which hydroxyl groups are bonded to an aromatic nucleus such as resorcinol, pyrogallol, phloroglucinol, di-, tri-, and tetra-phenylol compounds such as bis-(p-hydroxyphenyl)-methane and 2,2-bis-(p-hydroxyphenyl)-propane, and other such polyhydroxy compounds commonly known to those skilled in the art to which this invention relates. The alkylene oxides employed in producing polyether polyols (which are also known as poly (oxyalkylene) polyols usually have from 2 to 4 carbon atoms and are preferably ethylene oxide, propylene oxide and any combination thereof. In the preparation of mixed poly (oxyethylene-oxypropylene) polyols, the ethylene and propylene oxides may be added to the hydroxyl-containing reactant either in admixture or sequentially.

Suitable polyester polyols for use in the manufacture of polyurethanes are the reaction products of: (a) one or more of the aforesaid polyether polyols or polyhydroxy - containing organic compounds and an alkylene oxide to produce the foregoing polyether polyols, and (b) a polyfunctional organic carboxylic acid including aliphatic and aromatic acids. Typical examples of suitable polycarboxylic acids that can be employed in producing polyester polyols are: succinic, adipic, sebacic, azelaic, glutaric, pimelic, malonic and suberic acids; and aromatic acids such as phthalic acid, terephthalic acid, isophthalic acid, and the like.

Other suitable unhalogenated polyols for use in the manufacture of the flame-retardant polyurethanes of this invention are: lactone-based polyols prepared by reacting a lactone such as epsilon-caprolactone or a mixture of epsilon-caprolactone and an alkylene oxide with a polyfunctional initiator such as a polyhydric alcohol; and phosphorus-containing polyols such as the alkylene oxide adducts of phosphoric acid; polyphosphoric acids such as tri- and tetra-phosphoric acids; organo-substituted phosphoric acids such as benzenephosphoric acid, and the like.

In producing the rigid polyurethanes of the invention, the unhalogenated polyol preferably possesses a hydroxyl number from about 200 to about 1000 and preferably about 300 to 500. The hydroxyl number is defined as the number of milligrams of potassium hydroxide required for the complete neutralization of the hydrolysis product of the fully acetylated derivative prepared from 1 gram of polyol or mixture of polyols. The hydroxyl number can also be defined by the equation:

$$OH = \frac{56.1 \times 1000 \times f}{M.W.}$$

wherein
OH = hydroxyl number of the polyol;
$f$ = average functionality, that is, average number of hydroxyl groups per molecule of polyol;
M.W. = average molecular weight of the polyol.

In addition to the foregoing essentially unhalogenated neutral polyols, it is often desirable in securing rigid cellular foams of the invention, to incorporate low-molecular weight, basic nitrogen-containing polyols such as, illustratively, the totally hydroxypropylated ethylenediamine or diethylenetriamine described in U.S. Pat. No. 2,644,760 and U.S. Pat. No. 2,697,118 and various primary aliphatic amines. These nitrogen-containing polyols serve as chain extenders and cross-linking agents in the production of rigid urethane foams.

The fire retardant brominated polyol, 2,3-dibromo-2-butenediol-1,4, an essential component of the present invention, incorporated in the polymeric urethane chain is normally and substantially trans-2,3-dibromo-2-butenediol-1,4. This compound has the structural formula:

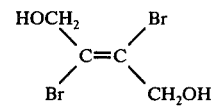

It is, however, within the contemplation of the invention that the foregoing brominated butenediol may be employed herein regardless of its steric configuration and regardless of whether it is present in a single isomeric form or as a mixture thereof.

The proportion of isocyanate groups to hydroxyl groups (in the reactant polyols described above and thus including the unhalogenated, halogenated and, where present, nitrogen-containing, polyols) is desirably from 2 to 8, and preferably 4 to 7, to 1, respectively. Thus the polyisocyanates are employed in amounts that provide from 200 to 800, and preferably 400 to 700, percent of the stoichiometric amount of the isocyanato groups required to react with all of the hydroxyl groups present in all of the reactant polyols. Expressed in an alternative manner, the polyol content of the reaction mixture represents about 10 percent to about 50 percent, and preferably about 15 percent to about 25 percent, by weight of the polyisocyanate incorporated in the reaction mixture. However expressed, it is critical to the invention that more than fifty percent of the isocyanato groups of the polyisocyanate reactant be free to react and form triazanone moieties within the foam structure.

The unhalogenated polyol is incorporated in the reaction mixture in an amount by weight of the total polyol present of about 30 percent to about 50 percent. The brominated butenediiol will in turn constitute about 50 percent to about 70 percent of the total polyol incorporated in the reaction mixture on a weight basis; that is about 5 percent to 10 percent by weight of the polyisocyanate reactant present; and the amine polyol is present optionally, not at all, or in an amount up to about 25 percent of the total polyol.

The hydrated alumina contemplated for use in the present invention is one in which a substantial quantity of heat is absorbed upon thermal decomposition of the hydrate and is thus characterized by possession of a water of crystallinity which in the course of thermal dehydration thereof results in the absorption of at least 300, and preferably up to 400, calories per gram of hydrate. In addition, the foregoing hydrated alumina contains a refractory oxide of the metal in an amount of more than about 60 percent by weight and having an atomic number less than 14. Trace or residual amounts of $SiO_2$, $Fe_2O_3$ and $Na_2O$, usually not in excess of about 3 percent by weight of the total composition of the alumina trihydrate, and often substantially less, are also present.

Particularly preferred in the practice of the present invention is alumina trihydrate having a median particle size generally within the range of from about 0.5 to 5 microns. Alumina trihydrate within this particle size range is readily available commercially. The density of the alumina trihydrate for use herein is usually within the range of 2,000 grams per liter to 3,000 grams per liter and where alpha alumina trihydrate is employed the density of the material is normally about 2,420 grams per liter. The hydrated alumina employed is most desirably within the range of about 10 percent to about 100 percent, and preferably about 35 percent to about 50 percent by weight of the polyisocyanate incorporated in the reaction mixture.

The term "reaction mixture," as employed herein, is intended to encompass the reactants, catalysts and additives present in the mixture used to form the cellular foams of the invention.

The antimony oxide ($Sb_2O_3$) employed in achieving the uniquely fire-retardant compositions of the invention occurs in crystalline form principally as senarmontite but also as valentinite. Normally, these crystalline forms occur in admixture with amounts by weight of about 5 percent of the latter present. The typical antimony oxide compositions employed contain at least 99 percent of $Sb_2O_3$, the remainder consisting usually lead, arsenic, iron, nickel, copper and sulfate. The average particle size used is from about 0.5 micron to 2.0 microns and most desirably from about 1.0 micron to 1.8 microns. Antimony oxide is incorporated in the reaction mixtures formulated in preparing the polyurethanes of the invention in an amount by weight of about 1 percent to 20 percent and preferably 4 percent to 12 percent of the organic polyisocyanate.

A trimerization catalyst is necessary to assure the formation of the rigid isocyanurate-urethane cellular foams of the invention. These catalysts are most desirably tertiary amines employed in small amounts. Preferred among these is 2,4,6-tris)dimethylaminomethyl) phenol.

Other tertiary amine catalysts which can be employed are triethylamine, N-ethylmorpholine, N-methylmorpholine, N-octadecylmorpholine, tributylamine; trioctylamine; N,N,N',N'-tetramethylethylenediamine, N,N,N',N'-tetramethyl-1,3-butanediamine; triethanolamine; N,N - dimethyl-ethanolamine; triisopropanolamine; N - methyldiethanolamine; bis(2-dimethylaminoethyl)ether; hexadecyldimethylamine; N,N-dimethylbenzyl amine; trimethylamine; triethylenediamine (i.e., 1,4-diazabicyclo-[2.2.2]-octane); the formate and other salts of triethylenediamine, oxyalkylene adducts of the amino groups of primary and secondary amines and other such amine catalysts which are well known in the art of polyurethane manufacture. The amine catalyst may be introduced to the polyurethane-producing reaction mixture as such or as a solution in suitable carrier solvents such as diethylene glycol; dipropylene glycol; and 2-methyl-2,4-pentanediol ("hexylene glycol"). The amine catalyst where employed is normally present in an amount on a weight percent basis based on the weight of the polyisocyanate present of two percent to ten percent. Other standard trimerization catalysts which may also be employed, although significantly less preferred, are triethyl phosphine, which is useful selectively where trimerization of aliphatic compounds is undertaken; calcium acetate; potassium acetate; sodium formate; sodium carbonate; sodium, methoxide; oxalic acid; sodium benzoate in dimethyl formoxide; and a large number of soluble compounds of iron, sodium, potassium, magnesium, mercury, nickel copper, zinc, aluminum, tin, vanadium, titanium and chromium, titanium tetrabutyrate, and oxygen. The utilization of these trimerization catalysts in producing rigid polyurethane forms is well known to those skilled in the art to which this invention pertains.

In forming these rigid cellular polyurethanes the reaction mixture includes as a cell-forming component blowing agents which are vaporized by the exothermic reaction of the isocyanate and moieties present in the reactant mixture. These blowing agents are conventionally halogenated hydrocarbons, notably trichlorofluoromethane, as well as, by way of illustration, dichlorodifluoromethane, 1, 1-dichloro-1-fluoroethane, hexafluorocyclobutene and octafluorocyclobutane. The principal advantage of these blowing agents is increased insulation in the foamed product. There are often economic advantages as well. It is noted additionally that the cellular foams of the invention possess a concentration of closed cells at least equivalent to that secured by the techniques known theretofore. Thus, the thermal insulation properties of the foam are not adversely affected by the incorporation of the enhanced fire retardancy described herein.

The amount of blowing agent employed in the foaming reaction will vary with the desired density of the cellular product and will also affect the closed cell content of the foam. This is of particular concern in the formation of the insulating materials described herein. A rigid foam having a high closed cell content, that is a content of at least 85 percent closed cells as determined by ASTM D-1940, is most desirable having a density of from about 1.0 to 10 pounds per cubic foot, and preferably 1.5 to 5 pounds per cubic foot as measured by ASTM D-1622. Accordingly, the concentration of blowing agent will usually be from about 5 percent to 50 percent and most desirably 10 percent to 35 percent by weight of the polyisocyanate incorporated in the reaction mixture.

A conventional silicone surfactant is incorporated as well in the reaction system of the invention in order to stabilize, in conjunction with the catalyst present, the cellular foam product. Illustrative of these are the polyoxalkylene-polydimethyl-siloxane block copolymers. These block copolymers enhance the concentration of closed cell content and hence lower moisture permeability in addition to improving the strength properties of the foam product. Illustrative copolymers accomplishing these purposes are described in U.S. Pat. No. 3,507,815 and U.S. Pat. No. 3,563,924.

Other nonionic, cationic, and anionic surface active agents may also be used but are generally less desirably employed. Illustrative of these are the nonionic surface active agents such as polyoxypropylene-polyoxyethylene copolymers (PLURONIC polyols) which do not influence materially either closed cell content or rigidity but do facilitate dispersion of the reactants and additives included in the reaction mixture.

The polydimethylsiloxanes, while usable, are even less preferred because of their tendency to yield foams having a coarse cell structure and lower cencentration of closed cells.

Additional surfactants include the long-chain fatty acid partial esters of hexitol anhydrides, polyoxyalkylene derivatives of hexitol anhydride partial long-chain fatty acid esters and the like.

The surfactant may be added with any of the two to six streams usually fed to the mixing head in the one-shot process. The amount of surfactant utilized on a weight basis is normally from about 1 percent to about 2 percent of the polyisocyanate present in the reaction mixture.

Methods of producing one-shot polyether and polyester urethane foams commercially are well known and include numerous processing variables such as the apparatus employed, mixer speeds, conveyor speeds and angles, and the like, well known to those skilled in the art to which the present invention pertains. The reaction is exothermic, as noted elsewhere herein, and as is any standard one-shot operation, each component of the formulation is admitted to the mixing head through individual lines at a predetermined speed and at ambient temperature. The surfactant is added to any of the reaction components passing as streams to the mixing head through any of several feed lines, usually 2 to 6 in number. Often the number of feed lines entering the head is reduced by introduction of the catalyst, or other components used only in small amounts, into the polyol line upstream from the mixing head. An in-line blender can be used to premix the components of the reaction system before they reach the mixing head. The orifice opening control, back pessure in the mixing head, pouring procedures and related steps are also adjusted within well-known, flexible and discretionary parameters.

The rigid foams prepared in accordance with the invention are, in any event, subject to post-curing in the absence of moisture at ambient or, if desired to accelerate the cure, at elevated temperatures, the permissible range being desirably about 20° C to 90° C for periods of time which will vary inversely with the curing temperature employed and varying from 1 to 24 hours. This postcure serves to complete the formation substantially of trimer within the foam structure.

The cellular polyester and polyether isocyanurate urethane rigid foams of the invention have particular application, as indicated hereinabove, as thermal insulating materials, particularly for utilization in roofing applications and other construction materials. These foam products have been found to have significant value when employed between facings of roofing felt, such as asphalt-impregnated roofing felt, for use above steel decks and platforms where rigid government and industry standards usually obtain.

The following examples are further illustrative of the invention. In these examples all parts and percentages are parts by weight of the total composition unless and to the extent otherwise expressly indicated.

EXAMPLE 1

This example illustrates the preparation of a rigid cellular isocyanurate-polyether urethane foam prepared in accordance with the practice of the invention and contrasts its properties as reflected by oxygen index with rigid isocyanurate-polyether urethane foams prepared in a comparable manner but absent one or more of the thermal stabilizing components of the inventive composition.

The following reaction components, catalyst and additives in the amounts recited in Table I were poured into a cardboard box 8 inches wide by 8 inches long in a free rise pour. Curing occurred substantially immediately.

TABLE I

| | Parts* |
|---|---|
| Polyphenylmethylene polisocyanate** | 100 |
| Propoxylated sucrose polyol (Dow Voranol RS 350)*** | 5.5 |
| 2,3-dibromobutene-2-diol-1,4 | 10 |
| Antimony oxide (Chemetron Fire Shield, H grade- 1 micron) | 7.9 |
| Hydrated alumina (Alcoa C333, 6.5–9.5 microns) | 75 |
| Silicone block copolymer surfactant (Dow Corning 193) | 1 |
| Trichlorofluoromethane blowing agent (DuPont Freon 11B) | 30 |
| Amine polyol catalyst**** (Jefferson Chemical Co's THANOL R 350X) | 5 |
| 2,4,6-Tris (dimethyl amino methyl) phenol catalyst Rohm & Haas DMP-30) | 7.5 |

*"Parts" as this term is employed in Examples 1 to 7 hereof means parts by weight per 100 parts by weight of polyisocyanate
**undistilled product produced by phosgenation of the polyamine obtained by acid-catalyzed condensation of aniline with formaldehyde (Mondur MR of Mobay Chemical Co.)
***hydroxyl number: 350
****triol obtained by reaction of alkylene oxide (propylene oxide) with Mannich reaction product of methylamine and formaldehyde, having hydroxyl number, 520–540 milligrams (mg.) KOH/grams (g); specific gravity (sp. gr.) 1.116 (20° C); and a viscosity of 12,000–17,000 centipoises (cps.) at 25° C.

The resulting product was permitted to stand for about two minutes and was then inserted in a post-curing oven for a period of about 1 hour at 90° C; the excess or unreacted isocyanate moieties of the reactant polyisocyanate remaining upon initiation of the post-curing step forming predominantly additional triazine rings within the foam structure.

The resulting rigid isocyanurate-polyether urethane foam had good uniform appearance, high closed cell content, a density of 2.5 pounds per cubic foot and an oxygen index of 48.3.

The oxygen index thus secured exceeded that which would be anticipated from the production of foams containing less than all of the thermal stabilizing components, hydrated alumina, antimony oxide and 2,3-dibromo-2-butenediol-1,4, of the invention. Thus, a rigid foam prepared as described hereinabove, but including only 10 parts of 2,3-dibromo-2-butenediol-1,4 (hereinafter referred to as the "control sample") manifested an oxygen index of 31.6. Reproducing the control sample but including 7.9 parts of antimony oxide, $Sb_2O_3$, resulted in an oxygen index of 37.0 for an increase in value of 5.4. Incorporation of hydrated alumina identical in kind and amount to that recited in Table I hereinabove into the formulation of the control sample resulted, in turn, in a foam having an oxygen index of 39.31 or 7.71 above that of the control sample i.e., 31.6. Thus, the combination of components, antimony oxide, hydrated alumina and dibromobutenediol, would be anticipated to have an oxygen index of 44.7 rather than the significantly superior value of at least 48.3 described above.

EXAMPLES 2 to 6

These examples illustrate the preparation of rigid cellular isocyanurate polyether and polyester urethane foams prepared in accordance with the practice of the invention in which certain of the ingredients and the proportions thereof are varied.

The reaction components, catalyst and additives in the amounts recited in Table II were poured between facing sheets of asphalt-impregnated felt disposed vertically about 1.5 inches apart in a metal mold.

TABLE II

| Example | 2 | 3 | 4 | 5 | 6 |
|---|---|---|---|---|---|
| Foam-forming Components | | | PARTS | | |

TABLE II-continued

| Example | 2 | 3 | 4 | 5 | 6 |
|---|---|---|---|---|---|
| Polyphenylmethylene polisocyanate (Mondur MR) | 100 | 100 | 100 | 100 | 100 |
| Propoxylated sucrose polyol (Dow Voranol RS 350) | 5 | 5 | 5 | 6 | — |
| Polycaprolactone* (NIAX polyol D 520) | — | — | — | — | 10 |
| 2,3-Dibromobutene-2-diol-1,4 | 10 | 10 | 10 | 8 | 8 |
| Alumina trihydrate (Alcoa C333, 6.5–9.5 microns) | 50 | 40 | 40 | 50 | 40 |
| Antimony oxide ($Sb_2O_3$) (Chemetron Fire Shield, H grade -1 micron) | 7.9 | 5 | 5 | 5 | 5 |
| Silicone block copolymer surfactant (Dow Corning 197) | — | — | 1.5 | — | — |
| Air Products & Chemicals Corp. surfactant LK 221** | 1.5 | 1.5 | — | 1.5 | 1.5 |
| Trichlorofluoromethane blowing agent (DuPont Fredon 11B) | 25 | 25 | 25 | 25 | 25 |
| Amine polyol catalyst (Jefferson Chemical Co.'s THANOL R 350X) | 5 | 5 | 5 | — | — |
| 2,4,6-Tris (dimethyl amino methyl) phenol catalyst (Rohm & Haas (DMP 30) | 6 | 6 | 6 | 6 | 6 |
| Foam Properties: | | | | | |
| Density, lb./ft$^3$ | 3.06 | 3.08 | 2.88 | 2.88 | 2.74 |
| Flammability, Oxygen Index (ASTMD 2863) | >48.1 | 45.1 | 45.8 | >48.1 | >48.1 |

*average molecular weight: 830; average hydroxyl number: 135
**copolymer of N-vinylpyrrolidone and dibutyl maleate prepared as described in U.S. patent 3,746,663.

The foam products of the Examples 2 to 6 were placed in a post-curing oven when a period of about two minutes had elapsed after initial pouring of the foams into the mold. The products were retained in the oven at 90° C for a period of one hour to complete the formation of predominantly triazonone rings within the foam structure in each instance.

The rigid foam products of Examples 3, 4 and 6 while employing substantially less hydrated alumina and antimony oxide than in Examples 1, 2 and 5 still exhibit a materially higher oxygen index than would be anticipated on the basis of the effectiveness of the 2,3-dibromo-2-butenediol-1,4, hydrated alumina and antimony oxide when used individually which as described in Example 1 would be expected cumulatively to provide a value of about 44.7.

Example 6 illustrates, in addition, the effectiveness of the practice according to the invention utilizing a polyester polyol.

Examples 5 and 6 show, additionally, the effectiveness of the invention even where a decreased amount of 2,3-dibromo-2-butenediol-1, 4 is utilized.

Examples 2 to 6 while employing lesser amounts of hydrated alumina than used in Example 1 still evidence a similar and significantly desirable oxygen index.

Example 3 also demonstrates that a surfactant other than a silicone can be employed without adversely affecting the practice of the invention.

It will be evident that the terms and expressions which have been employed are used as terms of description and not of limitation. There is no intention in the use of such terms and expressions of excluding equivalents of the features shown and described or portions thereof and it is recognized that various modifications, by way of illustration, but not of limitation, variations in proportions, procedures and materials are possible within the scope of the invention claimed.

What is claimed is:

1. A process for preparing a thermally stable, rigid cellular isocyanurate polyurethane foam that comprises reacting the polyols including an unhalogenated polyol and 2,3-dibromobutene-2-diol-1,4; wherein said 2,3-dibromobutene-2-diol-1,4 is incorporated in said reaction mixture in a proportion by weight of about 30 percent to about 60 percent of the total polyol incorporated in said reaction mixture; a polymethylene polyphenyl polyisocyanate in proportions such that the active hydrogen groups present in the total of the polyols are less than fifty percent of the number of isocyanato groups present in the polymethylene polyphenyl polyisocyanate of said reaction mixture; antimony oxide and hydrated alumina; each of said antimony oxide and said hydrated alumina being present in a proportion by weight of said polyisocyanate of about 1 percent to 20 percent and 10 percent to 100 percent respectively; together with a blowing agent and trimerization catalyst; and subjecting said reaction mixture to postcuring.

2. The process of claim 1, wherein said hydrated alumina is alumina trihydrate having a particle size of about 0.5 micron to 5 microns and characterized by a water of crystallinity which upon thermal dehydration results in absorption of at least 300 calories per gram of hydrate.

3. The process of claim 1 wherein said alumina trihydrate is alpha alumina trihydrate.

4. The process of claim 1 wherein the antimony oxide present has a particle size of about 0.25 micron to 5 microns.

5. The process of claim 1 wherein said unhalogenated polyol has a hydroxyl number of from about 200 to about 1000.

6. The process of claim 5 wherein said polyol is a poly(oxypropylene) derivative of sucrose.

7. The process of claim 1 wherein said unhalogenated polyol is a polyester polyol or a polyether polyol 8. The process of claim 1 wherein said trimerization catalyst is 2,4,6-tris (dimethylaminomethyl)phenol.

9. The process of claim 1 wherein said blowing agent is one that is vaporized by the exothermic reaction of the isocyanate and hydroxyl moieties of the reactant isocyanate and polyol.

10. The process of claim 9 wherein said blowing agent is a halogenated hydrocarbon.

11. The process of claim 10 wherein there is included in sad reaction mixture a low molecular weight basic nitrogen-containing polyol.

12. A thermally stable, rigid, cellular isocyanurate polyurethane foam comprising the reaction products of polyols including an unhalogenated polyol and 2,3-dibromo-2-butenediol-1,4; wherein said 2,3-dibromo-2-butenediol-1,4-is incorporated in said reaction mixture in a portion by weight of about 30 percent to about 60 percent of the total polyol incorporated in said reaction mixture; a polymethylene polyphenyl polyisocyanate in proportions such that the active hydrogen groups present in the total of the polyols are less than fifty percent of the number of isocyanato groups present in the polymethylene polyphenyl polyisocyanate of said reaction mixture; antimony oxide and hydrated alumina; each of said antimony oxide and said hydrated alumina being present in a proportion by weight of said polyisocyanate of about 1 percent to 20 percent and 10 percent to 100 percent respectively; together with a blowing agent and trimerization catalyst; and subjecting said reaction mixture to postcuring.

13. A rigid, cellular isocyanurate polyurethane foam as claimed in claim 12 wherein said hydrated alumina is alumina trihydrate.

14. A rigid, cellular isocyanurate polyurethane foam as claimed in claim 12 wherein said unhalongenated polyol has a hydroxyl number of from about 200 to about 1000.

15. A rigid, cellular isocyanurate polyurethane foam as claimed in claim 14 wherein said polyol is a poly (oxypropylene) derivative of sucrose.

16. A rigid, cellular isocyanurate polyurethane foam as claimed in claim 12 wherein said trimerization catalyst is 2,4,6-tris (dimethylaminomethyl)phenol.

17. A rigid, cellular isocyanurate polyurethane foam as claimed in claim 12 wherein said blowing agent is one that is vaporized by the exothermic reaction of the isocyanate and hydroxyl moieties of the reactant isocyanate and polyol.

18. A rigid, cellular isocyanurate polyurethane foam as claimed in claim 17 wherein said blowing agent is a halogenated hydrocarbon.

19. A rigid, cellular isocyanurate polyurethane foam as claimed in claim 12 wherein there is included a low molecular weight basic nitrogen-containing polyol.

20. A rigid, cellular isocyanurate polyurethane foam as claimed in claim 12 wherein said hydrated alumina has a water of crystallinity which in the course of thermal dehydration thereof results in the absorption of at least 300 calories per gram of hydrate.

21. A rigid, cellular isocyanurate polyurethane foam as claimed in claim 20 wherein said hdyrated alumina contains a refractory metal oxide in excess of about 60 percent by weight; and wherein sid metal has an atomic number of less than 16.

22. A rigid, cellular isocyanurate polyurethane foam as claimed in claim 13 wherein said alumina trihydrated is alpha alumina trihydrate.

23. A rigid, cellular isocyanurate polyurethane foam as claimed in claim 13 wherein said alumina trihydrate has a density within the range of 2000 grams per liter to 3000 grams per liter.

24. A rigid, cellular isocyanurate polyurethane foam as claimed in claim 13, wherein said hydrated alumina has a particle size of about 0.5 micron to about 5 microns.

25. A rigid, cellular isocyanurate polyurethane foam as claimed in claim 13, wherein said antimony oxide has a particle size of about 0.25 micron to 5 microns.

* * * * *